3,076,778
COMPOSITION OF HALOGENATED BUTYL RUBBER AND ETHYLENE TRITHIOCARBONATE AND VULCANIZED PRODUCT OF SAME
Leon S. Minckler, Jr., Metuchen, Irwin J. Gardner, Roselle Park, and Delmer L. Cottle, Highland Park, N.J., assignors to Esso Research and Engineering Company, a corporation of Delaware
No Drawing. Filed Apr. 22, 1959, Ser. No. 808,000
11 Claims. (Cl. 260—41.5)

This invention relates to rubbery polymeric compositions which are halogenated copolymers of isoolefins and multiolefins, to the preparation and vulcanization of such compositions, and especially to improved methods for curing halogenated butyl rubber with minor proportions of ethylene trithiocarbonate.

Copolymers of the above general type, especially where the copolymer contains about 85 to 99.5% (preferably about 95 to 99.5%) of a $C_4$ to $C_7$ isoolefin such as 2-methyl-1-butene, 3-methyl-1-butene or especially isobutylene with about 15 to 0.5% (preferably 5 to 0.5 weight percent) of a multiolefin of about 4 to 14, preferably about 4 to 6, carbon atoms and having a Staudinger molecular weight of between about 20,000 and 300,000 are commonly referred to in patents and in literature as "butyl rubber" or GR–I (Government Rubber—Isobutylene) and, for example, is referred to as "butyl rubber" in textbook "Synthetic Rubber" by G. S. Whitby. The preparation of butyl type rubber is also described in U.S. Patent 2,356,128 to Thomas et al. In general, the multiolefinic component of the rubber comprises such multiolefins as myrcene, allo-ocimene, dimethallyl or preferably a conjugated diolefin such as isoprene, butadiene, dimethyl butadiene, piperylene, etc. The reaction product of isobutylene and isoprene is preferred. Butyl rubber preferably has a mole percent unsaturation of between about 0.5 to 10.0.

Halogenated butyl-type rubbery copolymers, which are vulcanizable with zinc oxide alone and completely covulcanizable with more highly unsaturated rubbers into desirable materials of high tensile strength, are produced by halogenating the butyl rubber in a manner which does not appreciably degrade the molecular weight thereof, but with sufficient halogen to produce a rubbery product which, when vulcanized by sulfur, retains its tensile strength upon heat aging. Such halogenated butyl rubbers are readily covulcanizable with more highly unsaturated rubbers, for example by means of added sulfur, to produce rubbery products of excellent heat aging resistance since halogenated butyl rubbers do not greatly differ in curing rate as compared to natural rubber and synthetic rubbers such as GR–S rubber. The sulfur cures may optionally also be in the presence of basic metal oxides such as zinc oxide and accelerators.

It has now been discovered that halogenated butyl rubber may be vulcanized effectively with ethylene trithiocarbonate, especially in the presence of zinc oxide. The vulcanization reaction also may be in the presence or absence of such curatives as sulfur, accelerators such as thiuram sulfides, thiocarbamates, mercaptobenzothiazole, thiazyl sulfides or the like, organic polyamines and/or quinoid compounds such as para-quinone dioxime, etc. However, the preferred combination of curatives comprises an admixture of zinc oxide and ethylene trithiocarbonate.

In practicing the present invention, 100 parts by weight of halogenated butyl rubber are compounded, preferably in the presence of about 0.5 to 50, preferably about 1.0 30 parts by weight of a metal oxide (especially zinc oxide) with about 0.05 to 15.0, advantageously about 0.1 to 10, and preferably about 0.2 to 5.0 parts by weight of ethylene trithiocarbonate. To this foregoing composition is also preferably added, not only the above-mentioned curatives, but also about 20 to 100 parts by weight of a filler such as clays or carbon blacks, with the optional addition of such conventional compounding agents as antioxidants such as phenyl beta-naphthylamine, antitack agents such as stearic acid, resins, plasticizers, etc. The resulting compounded stock is then cured by heating the same for about 0.5 minute to 5.0 hours, preferably for about 2 minutes to 2 hours at a temperature level of between about 150° to 450° F., advantageously at about 200° to 400° F., and preferably at about 250° to 375° F. to produce a vulcanizate having excellent ozone resistance, permanent set, and relative damping.

In producing halogenated butyl rubber to be vulcanized in accordance with the present invention, unmodified, unvulcanized butyl rubber is carefully halogenated so as to contain about at least 0.5 weight percent (preferably at least about 1.0 weight percent) combined halogen but not more than about "X" weight percent combined fluorine or chlorine or 3 "X" weight percent combined bromine or iodine wherein:

$$X = \frac{M_3 L}{(100-L)M_1 + L(M_2+M_3)} \times 100$$

and $L$ = mole percent of the multiolefin in the polymer
$M_1$ = molecular weight of the isoolefin
$M_2$ = molecular weight of the multiolefin
$M_3$ = atomic weight of halogen Restated, there should be at least about 0.5 weight percent of combined halogen in the polymer but not more than about one atom of fluorine or chlorine or three atoms of bromine or iodine combined in the polymer per molecule of multiolefin present therein; i.e., not more than about one atom of combined fluorine or chlorine or three atoms of combined bromine or iodine per double bond in the polymer.

Suitable halogenating agents which may be employed are gaseous chlorine, liquid bromine, hydrogen fluoride, iodine monochloride, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), N-bromo-succinimide, N-chloroacetanilide, N-chloroacetamide, N,N'-dimethyl-5,5-dichloro or dibromo hydantoin, and other common halogenating agents.

The halogenation is generally conducted at about 0° to about +200° C., advantageously at about 10° to 65° C., preferably at about 20° to 50° C. (room temperature generally being satisfactory), depending upon the particular halogenation agent, for about one minute to several hours. An advantageous pressure range is from about 0.5 to 400 p.s.i.a.; atmospheric pressure being satisfactory. The halogenation conditions are regulated to halogenate the rubbery copolymer to the extent above-mentioned.

The halogenation may be accomplished in various ways. One process comprises preparing a solution of the copolymer as above, in a suitable inert liquid organic solvent such as a $C_3$ to $C_{10}$ or preferably at $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chloroform, trichloroethane, carbon tetrachloride, mixtures thereof, etc., and adding thereto gaseous chlorine, liquid bromine, or other halogenating agent, which may optionally be in solution, such as dissolved in any inert hydrocarbon, an alkyl chloride, carbon tetrachloride, etc.

ing agent was added and reacted for 30 minutes with the polymer at room temperature. The resulting chlorinated copolymer was precipitated with acetone, collected and redissolved in hexane three times and ultimately dried and analyzed and found to have a viscosity average molecular weight of 320,000 and to contain 1.4% chlorine based on the polymer. The physical characteristics of both zinc oxide and diamine-cured vulcanizates, containing this chlorinated interpolymer, were excellent.

HALOGENATED RUBBERS "B" TO "L"

Other examples of halogenated isoolefin-multiolefin copolymers which can be used are tabulated hereinafter, the amount of isoolefin and multiolefin in copolymer, halogenation agent, and amount of halogen combined in the copolymer being as follows:

| Halogenated rubber | Isoolefin (percent)[1] | Multiolefinic component (percent)[1] | Halogenation agent | Percent[1] halogen in the rubber |
|---|---|---|---|---|
| B | Isobutylene (98) | Isoprene (2) | $SO_2Cl_2$ | 1.2 chlorine. |
| C | Isobutylene (95) | Isoprene (5.0) | $Cl_2$ in $CCl_4$ | 2.5 chlorine. |
| D | Isobutylene (94) | Cyclopentadiene (6) | do | 2.0 chlorine. |
| E | Isobutylene (92) | Myrcene (8.0) | do | 1.6 chlorine. |
| F | 2-methyl-butene-1 (95) | Isoprene (5) | $Cl_2$ in hexane | 1.5 chlorine. |
| G | 3-methyl butene-1 (96) | Butadiene (4) | do | 1.9 chlorine. |
| H | Isobutylene (98) | 1-vinyl cyclohexene-3 (2) | $Cl_2$ in $CCl_4$ | 0.8 chlorine. |
| I | Isobutylene (92) | Butadiene (8) | Gaseous chlorine | 2.8 chlorine. |
| J | Isobutylene (85) | Isoprene (15) | do | 6.6 chlorine. |
| K | Isobutylene (98) | Isoprene (2) | N,N'-dichloro-5,5- dimethyl hydantoin | 1.1 chlorine. |
| L | Isobutylene (98) | Isoprene (2) | Liquid bromine | 2.3 bromine. |

[1] Percent in all instances is percent by weight.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine or hydrogen fluoride are employed to halogenate such a rubbery solution, they may also be diluted with up to about 50 times their volume, preferably about 0.1 to 5.0 times their volume of an inert gas such as nitrogen, methane, ethane, carbon dioxide, etc.

The resulting halogenated butyl rubber polymer may be recovered in various manners. The halogenated polymer may be precipitated with acetone or any other known non-solvent for the halogenated butyl rubber and dried under about 1 to 760 millimeters or higher of mercury pressure absolute at about 0° to 180° C., preferably at about 50° to 150° C. (e.g., 70° C.). Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or a dense sheet or slab by conventional milling and/or extruding procedures. The halogenated copolymer formed advantageously has a viscosity average molecular weight between about 200,000 and 2,500,000 and a mole percent unsaturation of between about 0.5 to 15.0, preferably about 0.6 to 5.0.

In order to more fully illustrate the present invention, the following experimental data are given:

CHLORINATED BUTYL RUBBER "A"

A copolymer of about 97% isobutylene and 3% isoprene having a viscosity average molecular weight of 320,000 was dissolved in hexane to form a 10% solution. To this polymer solution, 20 weight percent (based on the polymer) of liquid sulfuryl chloride as the chlorinat-

CHLORINATED BUTYL RUBBER "M"

An additional run was made chlorinating a commercial isobutylene-isoprene butyl rubber copolymer dissolved in benzene. The butyl rubber had a Mooney viscosity at 212° F. for 8 minutes of 75, and a mole percent unsaturation of 1.6. The chlorination of a solution of the uncured butyl rubber was conducted in a 500-gallon glasslined Pfaudler reactor equipped with an agitator, baffle, submersed stainless steel sparger ring and a conduit leading into the ring.

Gaseous chlorine was continuously added to the butyl rubber solution over a period of one-half hour at a temperature level of 30° C. and under atmospheric pressure. The chlorine was added to the reactor through the conduit via the sparger ring. The chlorination was then terminated and the solution containing the chlorinated butyl rubber formed was agitated for an additional 20 minutes. The resulting solution of chlorinated butyl rubber was then water washed three times to remove dissolved hydrogen chloride.

The absolute amount of butyl rubber, benzene solvent and gaseous chlorine added, as well as the calculated percent of added chlorine based on polymer and resulting percent of chlorine combined in the polymer were as follows:

| | Pounds | Percent in composition |
|---|---|---|
| Butyl rubber | 170 | 98.65 |
| Benzene solvent | 1,540 | |
| Chlorine added | [1] 4.8 | 1.35 |

[1] I.e., 2.8%.

The resulting water-washed solution containing the stabilized, chlorinated butyl rubber "M" was then recovered by injecting the solution into an agitated aqueous slurry containing zinc stearate and a small amount of the nonionic wetting agent of the aliphatic polyoxyethylene ether type such as Tergitol NPX (e.g., Sterox AJ) in an amount of 0.7 pound of the zinc stearate per 100 pounds of chlorinated butyl rubber as a dispersing aid. The agitated solution was maintained at a temperature between about 190° and 210° F. (e.g., 200° F.) thereby to flash off the benzene solvent and form an aqueous slurry of the chlorinated butyl rubber in water. This slurry was then filtered and the chlorinated butyl rubber, which was in the form of a wet "crumb," was placed in a Proctor and Schwartz tray drier maintained at 180° F. (i.e., 82° C.) and dried for 12 hours. The crumb depth on the tray was about ½ inch. The crumb was then completely dried and compacted by milling for 15 minutes on a conventional rubber mill having a roll temperature of 260° F. (i.e., 127° C.).

*Example 1*

100 parts by weight of a chlorinated isobutylene-isoprene butyl rubber copolymer having a Mooney viscosity (212° F. for 8 minutes) of 58, a mole percent unsaturation of 0.90, a viscosity average molecular weight of 455,000, and containing 1.2 weight percent of combined chlorine were compounded with 50 parts by weight of HAF carbon black, 1.0 part by weight of stearic acid, 3.0 parts by weight of zinc oxide, with and without 0.5 to 3.0 parts by weight of ethylene trithiocarbonate, with the following results upon curing:

|  | Sample | | | | |
|---|---|---|---|---|---|
|  | A | B | C | D | E |
| Ethylene trithiocarbonate, parts by weight | 0.5 | 1.0 | 2.0 | 3.0 | 0.0 |
| Cured 20 mins. at 307° F.: | | | | | |
| 100% modulus, p.s.i. | 510 | 650 | 765 | 860 | 270 |
| Tensile strength, p.s.i. | 2,010 | 1,850 | 1,775 | 1,620 | 2,130 |
| Elongation, percent | 270 | 185 | 170 | 145 | 375 |
| Hardness, Shore A | 67 | 68 | 69 | 72 | 60 |
| Ozone resistance (cured 40 mins. at 307° F.; 0.2% ozone at 50% ext.; 0.25" x 0.25" samples): | | | | | |
| Crack, minutes | 26 | 26 | 37 | 40 | 20 |
| Break, minutes | 125 | 347 | >600 | >600 | 71 |
| Goodrich flexometer data (cured 45 mins. at 307° F., load equals 89 p.s.i.; stroke equals 0.25"; freq. equals 30 c.p.s.): | | | | | |
| Permanent set, percent | 1.1 | 0.8 | 1.0 | 0.8 | 3.8 |
| Maximum temp. rise, °C | 23.5 | 20.0 | 22.5 | 17.5 | 34.0 |
| Yerzley oscillograph data: Relative damping, percent | 23.3 | 21.7 | 20.2 | 19.7 | 30.4 |

The above data shows that, in accordance with the present invention, the presence of ethylene trithiocarbonate, during curing, greatly increases ozone resistance and beneficially decreases both permanent set and relative damping of halogenated butyl rubber. Such vulcanized elastomers are useful in tires, curing bladders and electrical insulation.

*Example 2*

100 parts by weight of an isobutylene-isoprene brominated butyl rubber copolymer having a Mooney viscosity (212° F. for 8 minutes) of 66, a mole percent unsaturation of 0.71, a viscosity average molecular weight of 480,000, and containing 2.2 weight percent of combined bromine were compounded as in Example 1 except with and without either 0.5 part by weight of ethylene trithiocarbonate or tetramethyl thiuram disulfide with the following results upon curing:

|  | Sample | | |
|---|---|---|---|
|  | F | G | H |
| Ethylene trithiocarbonate, pts. | 0 | 0.5 | 0 |
| Tetramethyl thiuram disulfide, pts. | 0 | 0 | 0.5 |
| Goodrich flexometer data (cured 45 mins. at 307° F., load equals 89 p.s.i.; stroke equals 0.25"; freq. equals 30 c.p.s.): | | | |
| Permanent set, percent | (¹) | 0.6 | 2.6 |
| Tensile strength, p.s.i. (20 mins. at 307° F.) | 2,170 | 3,030 | 2,415 |
| Elongation, percent (20 mins. at 307° F.) | 480 | 490 | 425 |

¹ Blew out.

The above data show that the sample "G" of halogenated butyl rubber cured in accordance with the present invention in the presence of ethylene trithiocarbonate exhibited better permanent set and tensile strength than halogenated butyl rubber cured solely with zinc oxide or zinc oxide and tetramethyl thiuram disulfide.

*Example 3*

100 parts by weight of the same chlorinated butyl rubber as in Example 1 were compounded with the same amounts of HAF carbon black and stearic acid and also with the following curatives with the results as listed hereinafter when cured for 20 minutes at 307° F.:

| Component | Sample | | | | |
|---|---|---|---|---|---|
|  | A | B | C | D | E |
| Parts by weight: | | | | | |
| Zinc oxide | 3.0 | 3.0 | 3.0 | 3.0 | 3.0 |
| Ethylene trithiocarbonate | 0.5 | 0.5 | 0.5 | 0.5 | |
| Tetramethyl thiuram disulfide | 0.25 | | 0.25 | | |
| Sulfur | | 1.0 | | | |
| Benzothiazyl disulfide | | | 0.5 | | |
| Tellurium diethyl dithiocarbamate | | | | 0.5 | |
| 200% modulus, p.s.i. | 1,750 | 1,450 | 1,570 | 1,680 | 760 |
| Tensile strength, p.s.i. | 2,390 | 2,400 | 2,590 | 2,520 | 2,130 |
| Elongation, percent | 280 | 305 | 305 | 275 | 273 |
| Hardness, Shore A | 70 | 68 | 70 | 70 | 60 |
| Goodrich flexometer data (cured 45 mins. at 307° F.; load equals 89 p.s.i.; stroke equals 0.25"; frequency equals 30 c.p.s.): Permanent set, per. | 0.6 | 3.6 | 1.4 | 1.0 | Failed |
| Ozone resistance (cured 20 cent mins. at 307° F.): | | | | | |
| Minutes to crack | 51 | 42 | 51 | 49 | 20 |
| Minutes to break | 162 | 90 | 174 | 98 | 71 |

The above data show that the presence of ethylene trithiocarbonate improves the extension modulus, tensile strength, hardness, permanent set and ozone resistance of chlorinated butyl rubber vulcanized with a variety of curatives including zinc oxide and/or accelerators and/or sulfur.

Resort may be had to modifications and variations without departing from the spirit of the invention or the scope of the appended claims.

What is claimed is:

1. A composition comprising a major proportion of a rubbery halogenated copolymer of about 85 to 99.5 weight percent of a $C_4$ to $C_7$ isoolefin and about 15 to 0.5 weight percent of a $C_4$ to $C_{14}$ multiolefin and about 0.05 to 15.0 weight percent based on halogenated copolymer of ethylene trithiocarbonate, said copolymer containing at least 0.5 weight percent halogen but no more than 3 atoms of halogen per double bond in said copolymer.

2. A composition according to claim 1 in which the halogenated copolymer contains at least 0.5 weight percent chlorine but not more than about one atom of chlorine per double bond in the copolymer and said copolymer is in comopsition with a minor proportion of carbon black.

3. A composition according to claim 1 containing about 0.5 to 50 parts by weight per 100 parts by weight of copolymer of zinc oxide.

4. A composition according to claim 1 in which the halogenated copolymer contains at least about 0.5 weight percent bromine but not more than about three combined atoms of bromine per double bond in the copolymer and said copolymer is in composition with a minor proportion of a curative selected from the group consisting of zinc oxide and mixtures of zinc oxide with thiuram sulfides, thiocarbamates, mercaptobenzothiazole, thiazyl sulfides, organic polyamines and para-quinone dioxime.

5. A composition comprising (A) 100 parts by weight of a rubbery halogenated polymer of an isoolefin containing about 4–7 carbon atoms per molecule and about 15 to 0.5 wt. percent of a multiolefin having 4 to 14 carbon atoms, said copolymer having a viscosity average molecular weight of at least about 100,000 mole percent unsaturation between about 0.5 and 15 and containing at least about 0.5 weight percent halogen but not more than about three combined atoms of halogen per double bond in the polymer and (B) about 0.1 to 10.0 parts by weight of ethylene trithiocarbonate.

6. A composition according to claim 5 in which the polymer contains chlorine in an amount of not more than one atom per double bond.

7. A composition according to claim 5 in which the polymer contains bromine in an amount of not more than 2 atoms per double bond.

8. A composition according to claim 5 in which the ethylene trithiocarbonate is present in an amount of between about 0.2 and 5.0 weight percent based on the halogen-containing polymer, said composition also containing about 1.0 to 30 weight percent of zinc oxide on the same basis.

9. A process which comprises vulcanizing a rubbery halogenated copolymer of about 85 to 99.5 wt. percent of an isoolefin containing 4 to 7 carbon atoms per molecule and about 15 to 0.5 wt. percent of a multiolefin having 4 to 14 carbon atoms in the presence of between about 0.05 and 10.0 weight percent of ethylene trithiocarbonate at a temperature level of between about 150° and 450° F. for about 0.5 minute to 5.0 hours.

10. A process according to claim 9 in which the halogenated butyl rubber contains chlorine.

11. A process according to claim 9 in which the halogenated butyl rubber contains bromine.

References Cited in the file of this patent

UNITED STATES PATENTS

| | | |
|---|---|---|
| 2,193,415 | Coltof | Mar. 12, 1940 |
| 2,631,984 | Crawford | Mar. 17, 1953 |
| 2,732,354 | Morrissey | Jan. 24, 1956 |
| 2,955,102 | Clayton | Oct. 4, 1960 |